United States Patent [19]

Shimizu

[11] Patent Number: 5,323,319
[45] Date of Patent: Jun. 21, 1994

[54] DAMPING FORCE CONTROLLER

[75] Inventor: Hiroyuki Shimizu, Kanagawa, Japan

[73] Assignee: Atsugi Unisia Corporation, Kanagawa, Japan

[21] Appl. No.: 682,593

[22] Filed: Apr. 8, 1991

[30] Foreign Application Priority Data

Apr. 7, 1990 [JP] Japan .............................. 2-37574[U]

[51] Int. Cl.$^5$ ............................................ B60G 17/015
[52] U.S. Cl. ................................ 364/424.05; 280/707
[58] Field of Search ................... 364/424.05; 280/707

[56] References Cited

U.S. PATENT DOCUMENTS

| 4,526,401 | 7/1985 | Kakizaki et al. | 280/707 |
| 4,729,580 | 3/1988 | Buma et al. | 280/707 |
| 5,032,997 | 7/1991 | Kawagoe | 364/424.05 |
| 5,072,965 | 12/1991 | Wada et al. | 280/707 |
| 5,162,996 | 11/1992 | Matsumoto et al. | 364/424.05 |

FOREIGN PATENT DOCUMENTS 0139145  5/1985  European Pat. Off. .
0184915  6/1986  European Pat. Off. .

Primary Examiner—Vincent N. Trans
Attorney, Agent, or Firm—Bachman & LaPointe

[57] ABSTRACT

There is disclosed a damping force controller for controlling a damping force characteristic of a damper disposed between an unsprung mass and a sprung mass of a vehicle. A control unit repeatedly compares an output signal of a load sensor with a predetermined range. After the sensor output signal has been kept deviated from the predetermined range over a predetermined period of time longer than a resonance period of the unsprung mass, a damping force of the damper is increased for enhanced stability of the vehicle.

3 Claims, 6 Drawing Sheets

| ⑤ | A1 | A2 | A3 | A4 | A5 | A6 | A7 |
|---|----|----|----|----|----|----|----|
| D1 | 5 | 6 | 7 | 8 | 8 | 8 | 8 |
| D2 | 4 | 5 | 6 | 7 | 8 | 8 | 8 |
| D3 | 3 | 4 | 5 | 6 | 7 | 8 | 8 |
| D4 | 2 | 3 | 4 | 5 | 6 | 7 | 8 |
| D5 | 1 | 2 | 3 | 4 | 5 | 6 | 7 |
| D6 | 1 | 1 | 2 | 3 | 4 | 5 | 6 |
| D7 | 1 | 1 | 1 | 2 | 3 | 4 | 5 |

DAMPING FORCE CONTROLLER

BACKGROUND OF THE INVENTION

The present invention relates to a damping force controller for controlling a damping force characteristic of a damper disposed between an unsprung mass and a sprung mass of a vehicle, and more particularly to a damping force controller with a fail-safe function.

Japanese Patent Application First (unexamined) Publication No. 64-60411 discloses a system for controlling a damping force of a shock absorber disposed between an unsprung mass and a sprung mass of a vehicle. According to this known system, a load sensor of the piezoelectric type is disposed between a shock absorber and a suspension upper support of a mount insulator. An output of the load sensor is supplied to a control unit where a damping force vs., piston velocity characteristic of the shock absorber is stored. The output of the load sensor is used to retrieve the stored characteristic to give a velocity of the piston of the shock absorber. The velocity obtained is integrated to give a relative displacement. The relative displacement thus calculated is used in determining which of a plurality of damping force ranges is to be selected. In accordance with this result, the shock absorber is shifted to the damping force range selected. This system is not satisfactory in that should if the load sensor or its harness fail to operate normally, the shock absorber continues to produce a low damping force, resulting in degraded running stability of the vehicle.

An object of the present invention is to improve a damping force controller such that even if a load sensor or its harness fail to operate normally, running stability of the vehicle is maintained.

SUMMARY OF THE INVENTION

According to the present invention, there is provided a damping force controller for controlling a damping force characteristic of a damper disposed between an unsprung mass and a sprung mass of a vehicle, comprising:

means for detecting an operating state of the unsprung mass and generating a signal indicative of said operating state detected;

means for repeatedly comparing said operating state indicative signal with a predetermined range and generating an output signal after said operating signal indicative signal signal has been kept deviated from said predetermined range over a predetermined period of time; and means responsive to said output signal for increasing a damping force of the damper.

According to another aspect of the present invention, there is provided a method of controlling a damping force characteristic of a damper disposed between an unsprung mass and a sprung mass of a vehicle, the method comprising the steps of:

detecting an operating state of the unsprung mass and generating a signal indicative of said operating state detected;

repeatedly comparing said operating state indicative signal with a predetermined range and generating an output signal after said operating state indicative signal has been kept deviated from said predetermined range over a predetermined period of time; and increasing responsive to said output signal a damping force of the damper.

BRIEF DESCRIPTION OF THE INVENTION

DETAILED DESCRIPTION OF THE INVENTION

Referring to the accompanying drawings, an embodiment of a damping force controller according to the present invention is described.

Figure 1:
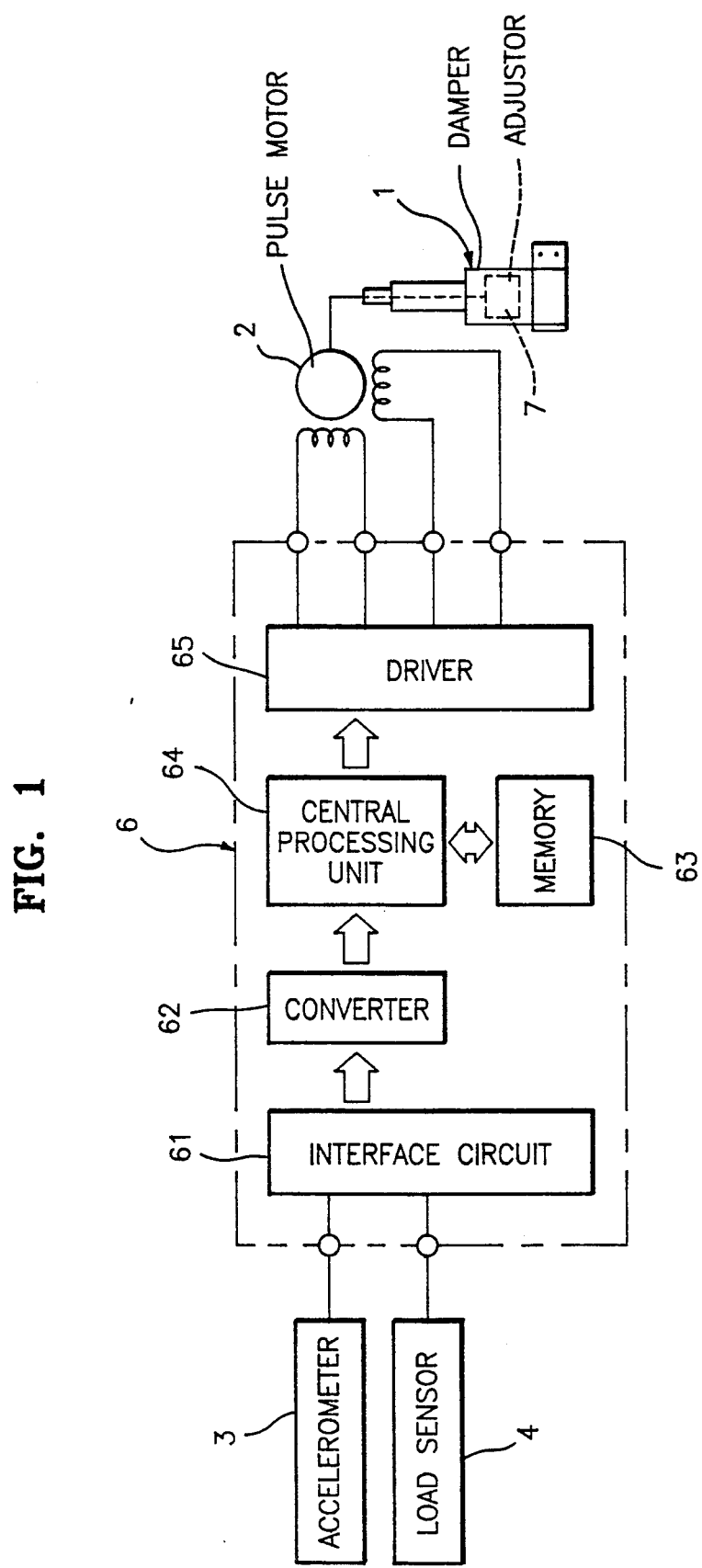
FIG. 1 is a block diagram of a damping force controller according to the present invention.

In FIG. 1, the reference numeral 1 denotes a damper, 2 a pulse or stepper motor, 3 a vertical accelerometer, and 4 a load sensor, and 6 a microcomputer based control unit.

Figure 4:
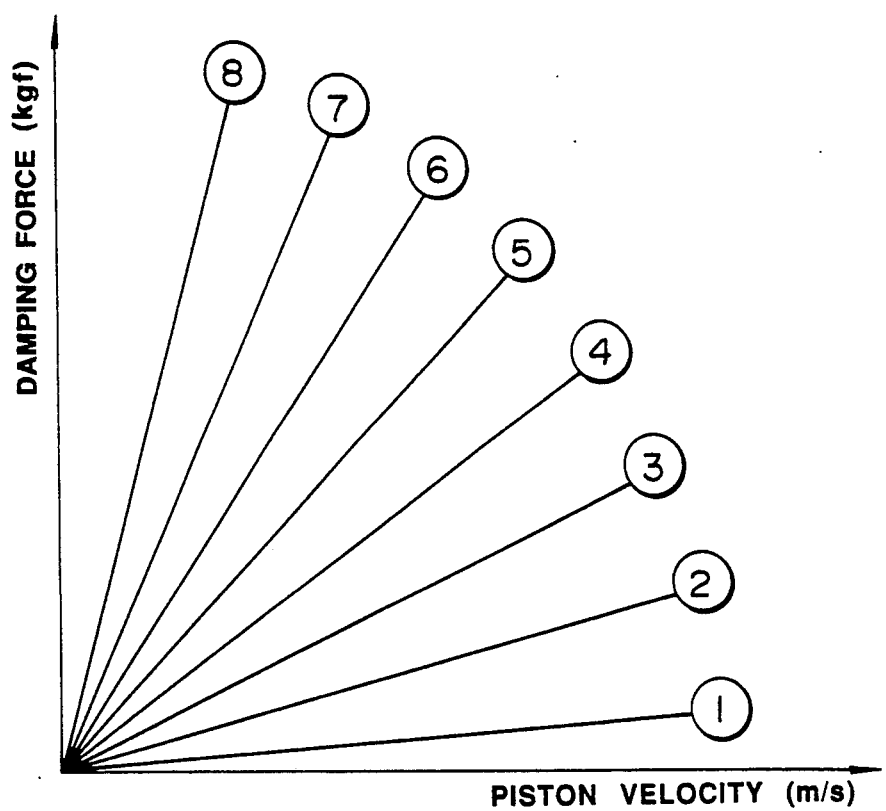
FIG. 4 is a graph showing eight different characteristics revealed by a damper used in the damping force controller.

The damper 1 is operatively disposed between an unsprung mass and a sprung mass of a vehicle in a conventional manner. This damper is provided with an adjustor 7 operable by the pulse motor 2 to assume eight angular positions, and provides eight different damping force vs., piston velocity characteristics as illustrated in FIG. 4.

The pulse motor 2 is operable to turn among eight different angular positions under the control of the control unit 6.

The vertical accelerometer 3 is fixedly attached to the vehicle body, and generates an electrical output signal indicative of vertical acceleration which the vehicle body is subject to.

The load sensor 4 is mounted to a mount insulator of the damper 1 to detect a load applied to the vehicle body through the damper 1 and generates an electrical output signal indicative of the load detected.

The output signals of the accelerometer 3 and load sensor 4 are fed to the control unit 6. Based on these signals, the control unit 6 determines a damping force characteristic and generates an output signal supplied to the pulse motor 2. This causes the pulse motor 2 to turn to one of its eight different angular positions, causing the adjustor 7 to take the corresponding one of its eight angular positions and the damper 1 to reveal the corresponding one of the eight different damping force characteristics as illustrated in FIG. 4.

Figures 2, 3:
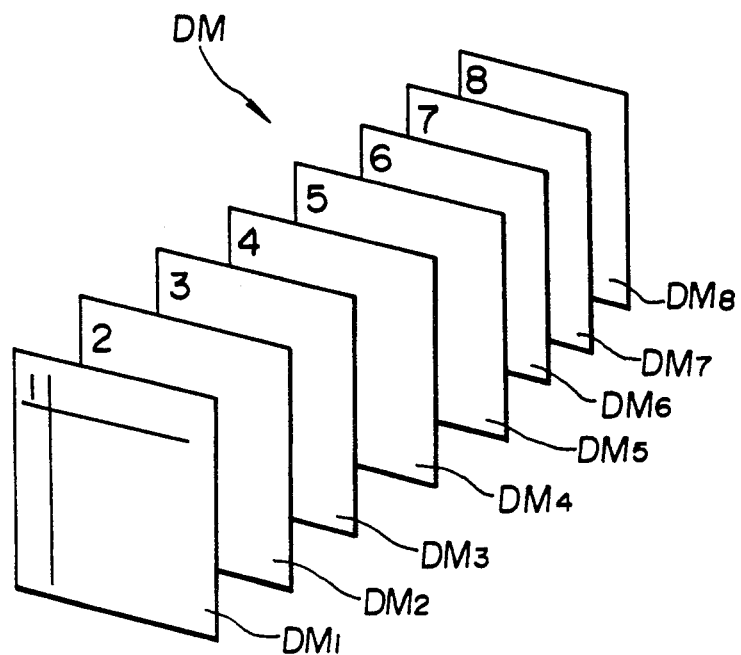
FIG. 2 is a diagram of an array of data maps stored in a memory of a microcomputer based control unit.
FIG. 3 is a diagram showing a content of one of the data maps.
Figure 5:
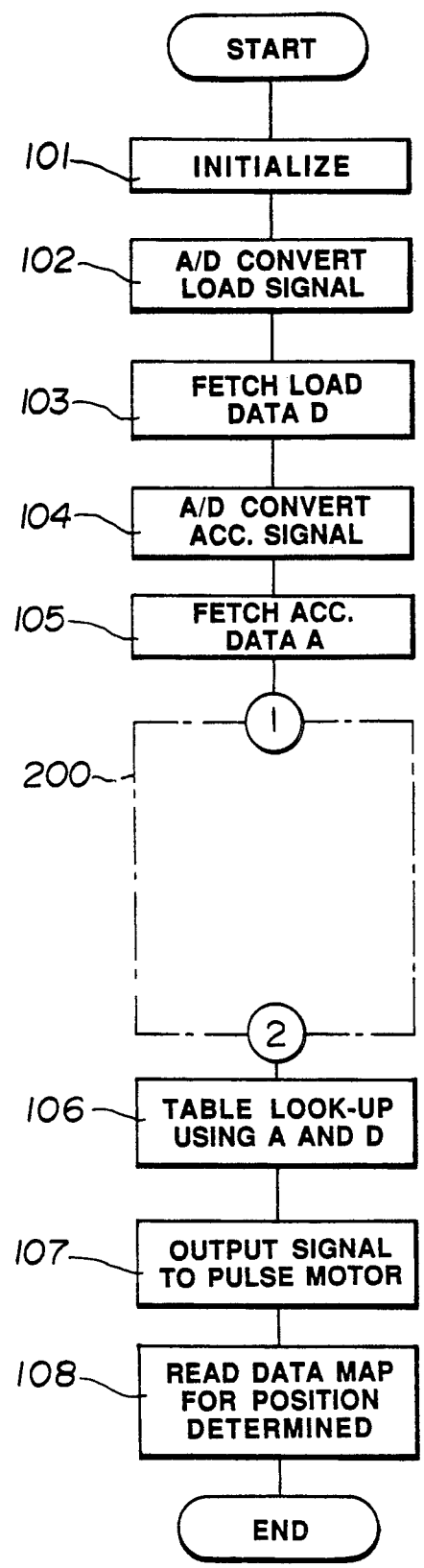
FIG. 5 is a flow diagram of a main routine stored and executed by the control unit.
Figure 6:
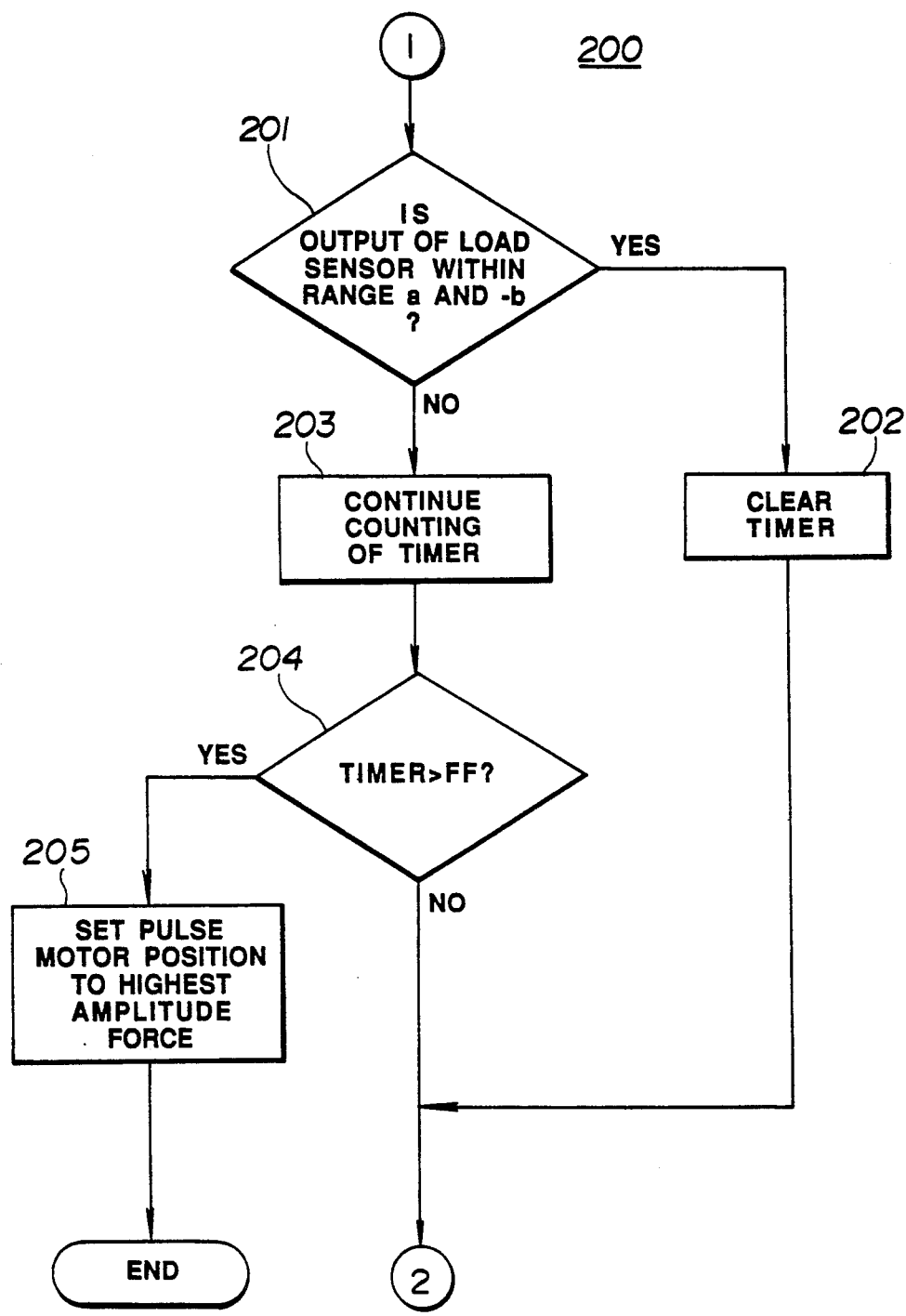
FIG. 6 is a flow diagram of a sub routine stored and executed by the control unit.

The control unit 6 includes an interface circuit 61 which the output signals of the accelerometer 3 and load sensor 4 are applied to, an analog to digital (A/D) converter 62 which converts the analog signals to digital signals, a memory 63 storing data maps illustrated in FIGS. 2 and 3, and main and sub routines illustrated in FIGS. 5 and 6, a central processing unit (CPU) 64, and a driver 65.

Referring to FIGS. 2 and 3, the data maps generally denoted by the reference character DM are briefly described. Eight data maps $DM_1$ to $DM_8$ are stored in the memory 63. Each of the data maps $DM_1$ to $DM_8$ contains angular positions of the pulse motor 2 versus different sets of vertical acceleration data and load data.

For example, FIG. 3 shows the fifth data map $DM_5$. As shown in FIG. 3, there is shown at the left top corner an identification number. In this case, the number 5 is assigned. Different numbers 1 to 8 are arranged versus different sets of values $A_1$ to $A_7$ of vertical acceleration and values $D_1$ to $D_7$ of load. Each of the numbers denotes an angular position which the pulse motor 2 should take. The relationship is such that $A_1<A_2<A_3<A_4<A_5<A_6<A_7$, and $D_1<D_2<D_3<D_4<D_5<D_6<D_7$.

Referring to FIGS. 5 and 6, at a step 101, initialization is made by setting a sign of load D and acceleration A to a positive (+) and by copying the data maps DM stored in a read only memory (ROM) section of the memory 63 to a random access memory (RAM) section of the memory 63 and sorting them in the order of $DM_1$, $DM_2$, $DM_3$, $DM_4$, $DM_5$, $DM_6$, $DM_7$, and $DM_8$.

At a step 102, the electrical output signal of the load sensor 4 is converted into a digital signal and stored as data D. At the subsequent step 103, the CPU 64 fetches this load data D.

At a step 104, the electrical output signal of the vertical accelerometer 3 is converted into a digital signal and stored as data A. At the subsequent step 105, the CPU 64 fetches this acceleration data A.

Figure 7:
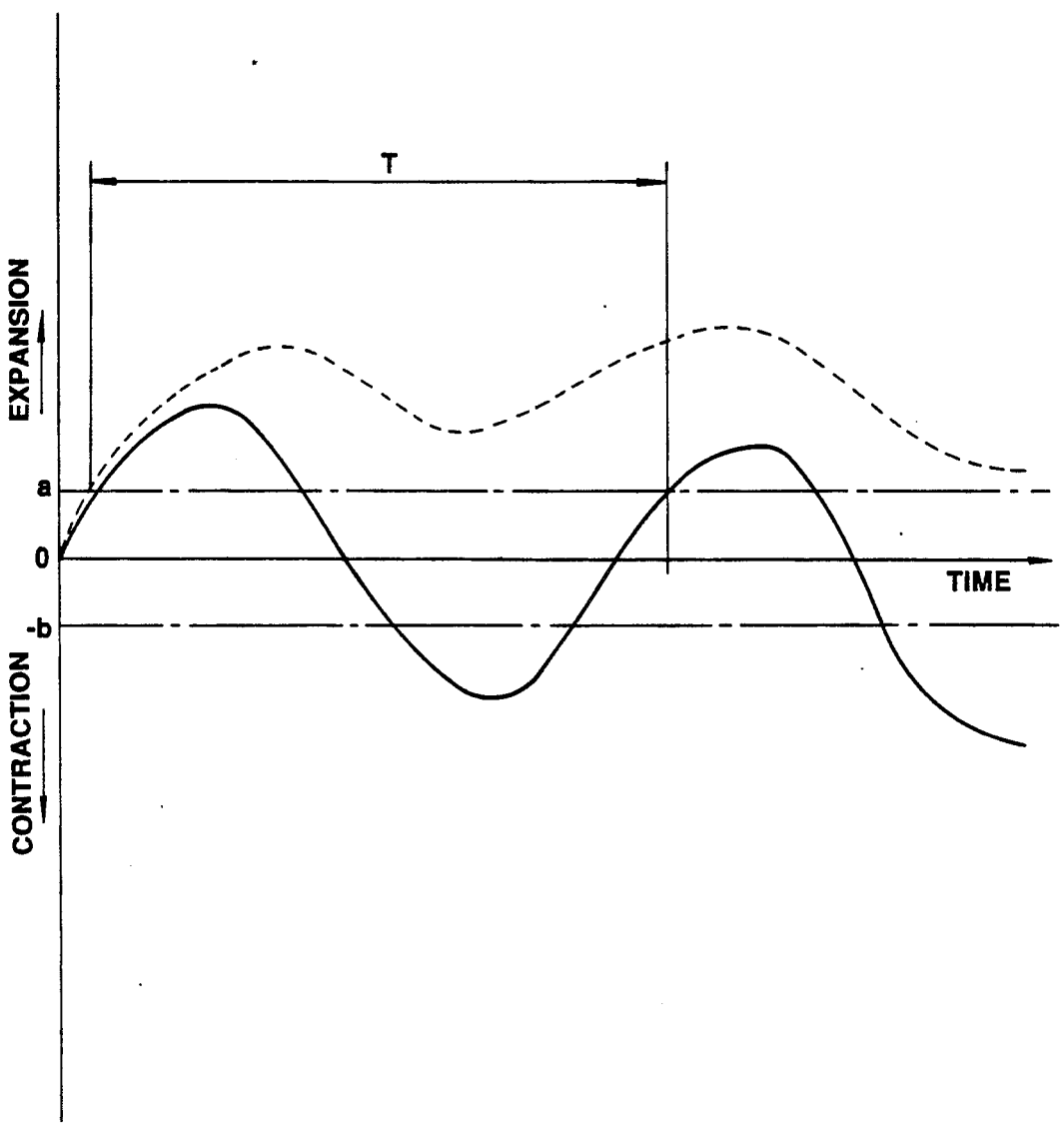
FIG. 7 is a time chart illustrating an actual wave of a damping force during bouncing and an output of a load sensor when the sensor fails to operate normally.

After this step 105, the program proceeds to a sub routine 200 shown in FIG. 6. Referring to FIG. 6, it is determined whether or not the output of the load sensor 4 falls in a range between two limits a and -b (see FIG. 7). FIG. 7 is the time chart showing the damping force wave during bouncing. In this Figure, the broken line curve shows output wave of the load sensor 4 when the load sensor 4 fails to operate normally. In FIG. 6, again, if the inquiry at the step 201 results in affirmative, the program proceeds to a step 202, while if this inquiry results in negative, the program proceeds to a step 203.

At the step 202, a timer TIMER is reset or cleared to zero. Then, the program proceeds to a step 106 (see FIG. 5).

At the step 203, the timer TIMER is allowed to continue counting. Then, the program proceeds to a decision step 204.

At the step 204, it is determined whether or not the count of the timer TIMER is greater than a predetermined value FF. If the inquiry at the step 204 results in negative, the program proceeds to the step 106 (see FIG. 5). If this inquiry results in affirmative, the program proceeds to a step 205. The setting of the predetermined value FF is such that this value corresponds to a period of time longer than a resonance period of the unsprung mass.

At the step 205, the CPU 64 sets the angular position which the pulse motor 2 should take to an number 8. In response to the output of the control unit 6, the damper 1 reveals the highest amplitude force characteristic.

In FIG. 5, at the step 106, one of the eight data maps, corresponding in number to the number of angular position which the pulse motor 2 assumes, is selected, and a table look-up operation of the data map $DM_1$ selected is performed using the acceleration data A and load data D to give a number indicative of an appropriate angular position of the stepper motor 2.

At the subsequent step 107, the control unit 6 generates an output signal indicative of the number given at the step 106. In response to this output signal, the pulse motor 2 takes the appropriate angular position corresponding to the number given at the step 106. Then, the program proceeds to a step 108 where one of the data maps corresponding to the angular position which the pulse motor 2 takes is read. With this step, one cycle is completed. The execution of this main and sub routines is repeated.

The operation is described.

In the case where the load sensor 4 operates normally:

When the load sensor 4 operates normally and thus generates an output signal corresponding to the resonance period of damping force as illustrated by the fully drawn curve in FIG. 7, the output signal of the load sensor 4 immediately returns to a value within the range a and -b before expiration of the resonance period T of the vehicle body after it has deviated from this range. Thus, the program proceeds passing the step 205, and the damping force is adjusted to an appropriate characteristic determined at the step 106.

In the case where the load sensor 4 fails to operate normally:

When the load sensor 4 fails to operate normally and thus generates an output signal varying as illustrated in the broken line curve in FIG. 7, the output signal is kept deviated from the range a and -b over a period of time corresponding to the predetermined value FF. Thus, the program proceeds to the step 205 where the damper 1 is set to show the highest or at least higher damping force characteristic.

From the preceding description of the embodiment, it will now be appreciated that since the damper is set to reveal the highest or at least higher damping force characteristic if the load sensor fails to operate normally, running stability of the vehicle is maintained.

In this embodiment, the data maps stored in the memory are used to determine the appropriate damping characteristic for the vertical acceleration and load. This results in improved resonse of the system.

In this embodiment, an appropriate damping characteristic is selected out of the eight characteristics. The number of damping characteristics is not limited to this number.

What is claimed is:

1. A system for controlling a damping force characteristic of a damper of a vehicle comprising:
 a load sensor which is so constructed and arranged to detect a load applied to the vehicle body through the damper, said load sensor generating a load indicative sensor signal indicative of said load detected; and
 control means for determining a damping force characteristic for said damper, said control means including
 (a) means for repeatedly determining whether said load indicative sensor signal is deviated from a predetermined range in value, said determining means incrementing a timer when said load indicative sensor signal is deviated from said predetermined range in value and clearing said timer when said load indicative sensor signal fails to be deviated from said predetermined range in value;
 (b) means for determining whether said timer is greater than a predetermined value and generating an output signal when said timer is greater than said predetermined value; and (c) means responsive to said output signal for increasing a damping force produced by said damper when said output signal is generated.

2. In a vehicle with a vehicle body:

a damper so constructed and arranged as to apply a load to the vehicle body, said damper having a plurality of different damping force characteristics providing different damping forces;

a motor operatively coupled with said damper, said motor having a plurality of positions corresponding in number to said plurality of different damping force characteristics;

a load sensor for detecting said load applied to the vehicle body through the damper and for generating a load indicative sensor signal indicative of said load detected; and a control unit operatively coupled to said load sensor and said motor, said control unit including:

means for repeatedly determining whether said load indicative sensor signal is deviated from a predetermined range in value, said determining means incrementing a timer when said load indicative sensor signal is deviated from said predetermined range in value and clearing said timer when said load indicative sensor signal fails to be deviated from said predetermined range in value;

means for determining whether said timer is greater than a predetermined value and generating an output signal when said timer is greater than said predetermined value; and means responsive to said output signal for setting said motor at a predetermined one of said plurality of motor positions when said output signal is generated.

3. A method for controlling a damping force characteristic of a damper of a vehicle, the method comprising the steps of:

detecting a load applied to a body of the vehicle through the damper and generating a load indicative sensor signal indicative of said load detected;

repeatedly determining whether said load indicative sensor signal is deviated from a predetermined range in value;

incrementing a timer when said load indicative sensor signal is deviated from said predetermined range in value and clearing said timer when said load indicative sensor signal fails to be deviated from said predetermined range in value;

determining whether said timer is greater than a predetermined value and generating an output signal when said timer is greater than said predetermined value; and setting the damper in a condition to produce an increased damping force when said output signal is generated.

* * * * *